United States Patent
Rudkowski

(10) Patent No.: US 7,427,763 B2
(45) Date of Patent: Sep. 23, 2008

(54) DEVICE FOR THE UV TREATMENT OF FLOWING FLUIDS

(75) Inventor: Jan Boris Rudkowski, Bielefeld (DE)

(73) Assignee: Wedeco AG (DE)

( * ) Notice: Subject to any disclaimer, the term of this patent is extended or adjusted under 35 U.S.C. 154(b) by 270 days.

(21) Appl. No.: 10/567,834

(22) PCT Filed: Aug. 12, 2004

(86) PCT No.: PCT/EP2004/009035
§ 371 (c)(1), (2), (4) Date: Feb. 8, 2006

(87) PCT Pub. No.: WO2005/019782
PCT Pub. Date: Mar. 3, 2005

(65) Prior Publication Data
US 2006/0231764 A1   Oct. 19, 2006

(30) Foreign Application Priority Data
Aug. 13, 2003  (DE) ................... 103 37 378

(51) Int. Cl.
*A61L 2/10* (2006.01)
*C02F 1/32* (2006.01)

(52) U.S. Cl. .............. 250/435; 250/436; 250/373; 422/24; 422/186.3; 210/745; 210/748

(58) Field of Classification Search .......... 250/436, 250/435, 373; 422/24, 186.3; 210/745, 748
See application file for complete search history.

(56) References Cited

U.S. PATENT DOCUMENTS

| 4,304,996 A | 12/1981 | Blades |
| 4,471,225 A | 9/1984 | Hillman |
| 6,264,836 B1 * | 7/2001 | Lantis .................. 210/188 |

FOREIGN PATENT DOCUMENTS

| EP | 1 296 541 | 3/2003 |
| JP | 2000070928 | 3/2000 |
| WO | WO 02/12127 | 2/2002 |

OTHER PUBLICATIONS

XP-000722146, Article, "Eine Uüberwachungseinheit fur die Strahlungsmessung in UV-Desinfektionsanlagen" (Control Unit for Monitoring UV Irradiation in UV disinfection reactors).

\* cited by examiner

*Primary Examiner*—Jack I Berman
(74) *Attorney, Agent, or Firm*—Robert W. Becker; Robert Becker & Assoc

(57) ABSTRACT

A method of operating a UV disinfection device provided with at least one UV emitter, including supplying the emitter with an operating voltage for a firing and continuous operation thereof, modulating the operating voltage, an operating current, or an electrical power of the UV emitter, detecting the UV radiation emitted by the emitter with a UV sensor that is adapted to temporally resolve the modulation, evaluating the signal recorded by the UV sensor, and checking whether the modulation in the signal given off by the sensor corresponds to a desired value.

15 Claims, 2 Drawing Sheets

DEVICE FOR THE UV TREATMENT OF FLOWING FLUIDS

This specification for the instant application should be granted the priority date of Aug. 13, 2003, the filing date of the corresponding German patent application 103 37 378.0 as well as the priority date of 12 Aug. 2004, the filing date of the corresponding International patent application PCT/EP2004/009035.

BACKGROUND OF THE INVENTION

The present invention relates to a device for the UV treatment of flowing media, in particular to a device for the UV disinfection of drinking water or waste water.

Generic devices are known from the practice, for example from documents U.S. Pat. No. 5,368,826, U.S. Pat. No. 5,660,719, EP 068 7201 and WO 00/40511.

The general technical background of the present invention relates to UV disinfection systems. A distinction must firstly be drawn between UV disinfection systems comprising medium-pressure emitters, which are not the subject of the present invention, and systems of this type comprising low-pressure mercury UV emitters. The systems comprising medium-pressure emitters conventionally have few emitter units, which are distinguished by high UV radiation power with correspondingly increased electrical power consumption. As there are, in this case, only a few emitters, separate monitoring of each individual emitter is easily possible. In the case of medium-pressure emitters, the cost of this monitoring is low compared to other expenses and equipment costs.

A significantly larger number of emitters are used in systems comprising low-pressure emitters. Although these emitters respectively have lower UV radiation power, they require lower equipment costs than medium-pressure emitters and are also substantially more efficient, thus reducing operating costs. In some cases, systems of this type therefore comprise several hundred emitters, which are arranged as what is known as an array in one or more flow channels. These emitters are conventionally used and operated jointly when they are new. The service life of emitters of this type is approximately 8,000 to 9,000 operating hours, i.e. about one year. After this time, the radiation power has decreased to the extent that the emitters have to be exchanged. The emitted radiation power is monitored by UV sensors, which monitor either the entire array or individual selected modules or groups of the array, as in the abovementioned documents U.S. Pat. No. 5,368,826, EP 068 7201 and WO 00/40511. These documents do not make provision for individual monitoring of all of the emitters. In practice, it is assumed that all of the emitters age uniformly.

U.S. Pat. No. 5,660,719 proposes one approach for monitoring individual emitters. In this device, a coil, which receives from the power supply the electromagnetic radiation of the emitter in operation and which is then separately evaluated, is allocated to each lamp. The emitted radiation intensity itself is also in this document measured via a single UV sensor for a plurality of emitters, so the intensity signal is provided only for the overall array, while the information from the operating voltage is provided for each individual lamp.

However, monitoring of the individual radiation power of each individual emitter is therefore possible only indirectly, as the supply voltage path does not provide a clear indication of the emitted UV radiation. It is therefore conceivable, for example, that, in the case of an electrical emitter, which is entirely intact from the point of view of gas inflation, the emitter tube or the cladding tube surrounding the emitter has only limited UV transparency and there is therefore less UV radiation available than is assumed according to the electrical parameters.

The object of the present invention is therefore to provide a device for the UV treatment of flowing media, in which the radiation power of many low-pressure mercury emitters is individually monitored.

SUMMARY OF THE INVENTION

This object is achieved by a device having a plurality of UV emitters that are disposed in the flow channel, at least one UV sensor adapted to monitor the operating state of the emitters, at least one power supply means for supplying power to the emitters, wherein the power supply means is configured to modulate an operating voltage, for individual ones of the emitters or groups of the emitters, that is supplied to the emitters during operation, and at least one unit, connected with the UV sensor, for monitoring the emitters, wherein the unit is configured to evaluate a modulation contained in the UV radiation emitted by the emitters.

Because provision is made to configure the element for supplying power to the emitter in such a way that an operating voltage or current that acts on the emitters during operation, and therefore the radiation flux for individual emitters or emitter groups that is emitted by the emitter, may be modulated, and because at least one unit, which is connected to the sensor means, for monitoring the emitters is configured to evaluate a modulation contained in the UV radiation that is emitted by the emitters, it may be determined whether an emitter that is acted on by a specific modulation reproduces this modulation in the emitted radiation. A conclusion may thus be drawn regarding the operating state of the emitter acted on by the modulation. The operating voltage of each individual emitter may, for example, be modulated separately in such a way that each emitter may be checked individually. This modulation may simply be an amplitude modulation.

In the case of a method according to the invention for the operation of a UV disinfection device, the following steps are provided:

a) supplying the emitters with an operating voltage for the purposes of ignition or firing and for the continuous operation of the emitters;

b) modulating the operating voltage of at least one emitter;

c) detecting the UV radiation that is emitted by the emitters using a UV sensor, which is capable of temporally resolving the modulation;

d) evaluating the signal recorded by the UV sensor;

e) checking whether the modulation in the signal issued by the UV sensor corresponds to a desired value.

This method allows the operating voltage of an individual emitter, a group of emitters or all of the emitters to be modulated simultaneously. If all of the emitters are modulated simultaneously and the modulation is carried out separately for each emitter (for example, at a different modulation frequency), all of the emitters may be monitored simultaneously during operation in that the sensor signal is evaluated with respect to the various types of modulation and the individual components are filtered out.

It may also be provided that, during operation, the emitters are operated in a substantially unmodulated manner and, for checking an individual emitter, only this individual emitter is supplied with modulated operating voltage. If the modulation is then reflected in the sensor signal, the operating state of the emitter may be determined. All of the emitters may thus be checked in succession, and this may be repeated cyclically.

The operating voltage of the low-pressure mercury UV emitters has, for example, a natural frequency in the range from 20 kHz to 1 MHz. The modulation of the operating voltage is in the form of amplitude modulation at frequencies in the range from 100 Hz to 100 kHz.

Adjacent emitters may be combined into groups, wherein the emitters of one group may jointly be modulated at similar frequencies, in particular at frequencies that are adjacent in a frequency grid.

The invention further proposes an electronic power supply unit for a low-pressure mercury emitter, which unit is configured for applying a modulation to the operating voltage or the issued electrical power, preferably as a function of an external control system.

BRIEF DESCRIPTION OF THE DRAWINGS

An embodiment of the present invention will be described below with reference to the drawings, in which.

DESCRIPTION OF SPECIFIC EMBODIMENTS

Figure 1:
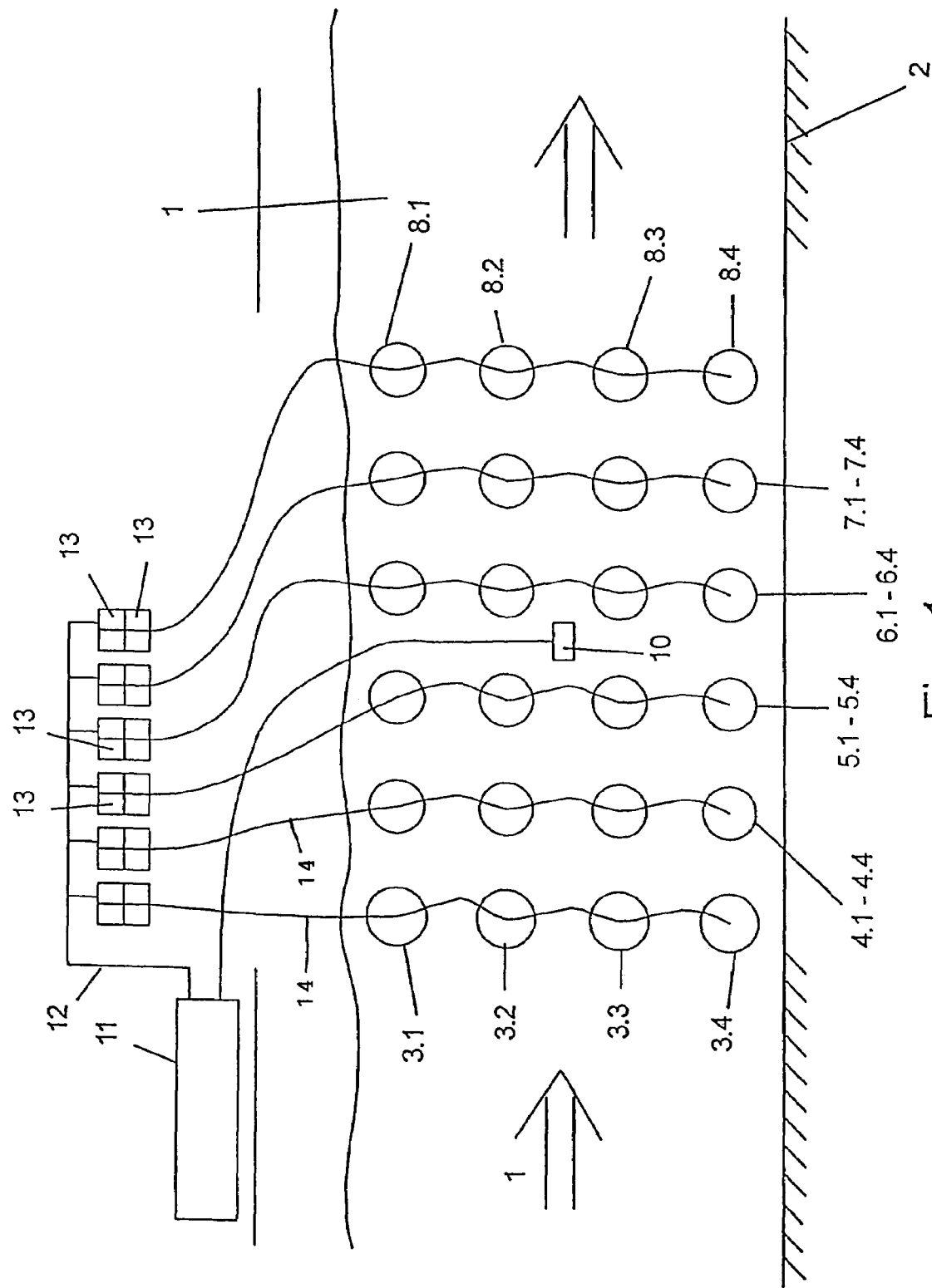
FIG. 1 is a cross section, seen from the side, of a UV disinfection system for flowing water.

FIG. 1 illustrates schematically, in a cross section seen from the side, a device for the disinfection of flowing waste water. The flow of waste water 1 flows in a channel 2, from left to right as shown in FIG. 1. The waste water 1 is the outflow of a sewage treatment plant, i.e. waste water that has already been mechanically and biologically filtered and is substantially transparent, but may still contain microorganisms.

For the purposes of disinfection, UV emitters 3.1, 3.2, 3.3 and 3.4, which are known per se and have the construction of the low-pressure mercury UV emitters, are arranged in the channel 2. These emitters are tubular and extend, in FIG. 1, perpendicularly to the drawing plane, i.e. transversely to the direction of flow of the waste water 1. However, they may also be arranged perpendicularly or longitudinally in the channel 2. The UV emitters 3 are conventionally constructed in such a way that cladding tubes made from quartz surround and protect the actual UV emitters from deposits from the waste water and from mechanical damage caused by solids entrained in the waste water. Further emitter groups 4.1 to 4.4, 5.1 to 5.4, 6.1 to 6.4, 7.1 to 7.4 and 8.1 to 8.4 are arranged downstream of the first emitter group 3. A UV sensor 10 is arranged approximately centrally in the emitter arrangement 3.1 to 8.4. The UV sensor 10 comprises a silicon carbide diode and is electrically connected to a control device 11. The control device 11 controls a number of electronic series connection or power supply units 13 via a connection line 12, an electronic power supply unit 13 being associated with each UV emitter. In FIG. 1, four respective power supply units are combined to form one unit and are associated with a group of four emitters.

The power supply units 13 supply the UV emitters with an operating voltage, which has to have defined current and voltage paths for the purposes of ignition or firing and for the operation of the UV emitter, via supply lines 14.

For the low-pressure mercury emitters that are conventionally used, the supply voltage that is issued during operation by the electronic power supply units 13 is an alternating voltage having a frequency in the range from 50 to 100 kHz.

Because the UV sensor 10 receives, as is known from the prior art, direct and indirect UV radiation from all of the emitters, it may not easily be determined whether a specific emitter has ignited and is radiating in the intended manner.

In order to determine this, a specific power supply unit 13 is activated by the control device 11 in such a way that the operating voltage of the emitter associated with this control device is modulated at an amplitude modulation of, for example, 400 Hz and a range of also, for example, +/−10% of the operating voltage. The intensity, which oscillates at the modulation frequency of 400 Hz, may be detected using the UV sensor 10. Unlike in the case of conventional sensors, the UV sensor 10 is accordingly not provided with a low-pass filter, which conventionally cuts out frequencies above approximately 20 Hz in order to rule out effects of the mains frequency (50 Hz or 60 Hz). The UV sensor according to the present invention, on the other hand, operates up to frequencies of at least several kilohertz.

Figure 2:
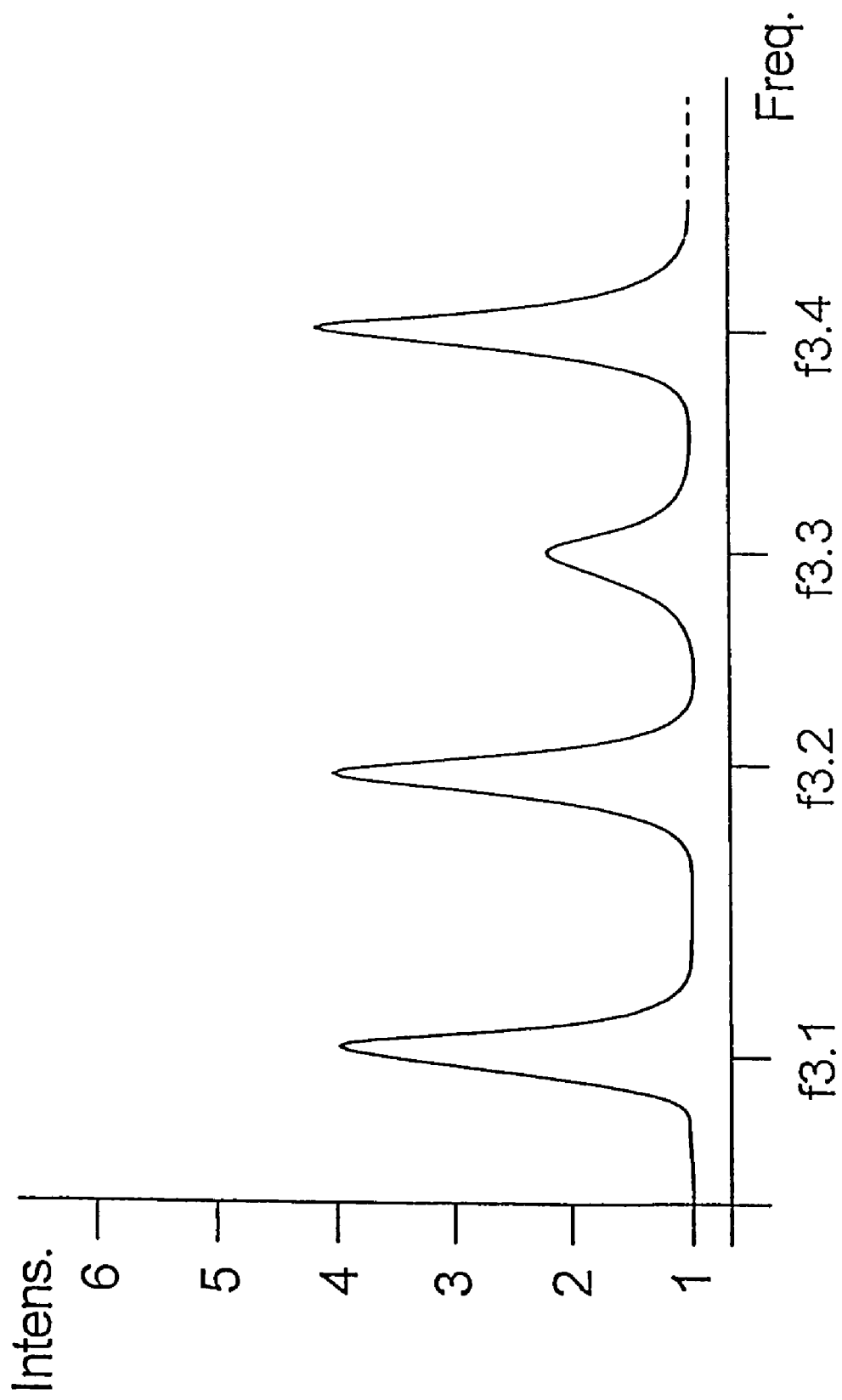
FIG. 2 shows the Fourier-transformed intensity spectrum as generated by the system according to FIG. 1 during operation.

In order to evaluate the intensity signal that is received by the UV sensor 10 and forwarded to the control device 11, this signal is expediently subjected to a Fourier transformation, for example using the known FFT algorithm. Using this algorithm, the UV radiation spectrum, as it is received by the UV sensor 10, is broken down in terms of intensity and frequency. FIG. 2 illustrates a spectrum of this type.

In FIG. 2, the Fourier-transformed signal of the UV sensor 10 is plotted as a frequency spectrum. The frequency is plotted on the X-axis, the relative intensity, in arbitrary units, on the Y-axis.

In the case of the exemplary spectrum, the frequencies f3.1, f3.2 and f3.4 have approximately the same intensity, whereas the curve at the frequency f3.3 has a lower intensity. In the control device 11, this spectrum would then be evaluated in such a way that the emitter 3.3 associated with frequency f3.3 does not convert the modulation signal, which has the same range in the operating voltage of all of the emitters, into a corresponding intensity modulation. This is an indication of the fact that the overall radiation power of the emitter 3.3 is lower than that of the other three emitters of the emitter group.

The modulation frequencies of the remaining emitters 4.1 to 8.4 are not shown in FIG. 2. They are located, according to the illustration of FIG. 2, at different frequencies. The clarity of the frequency spectrum is improved if the modulation frequencies of adjacent emitters are similar. A modulation frequency of 400 Hz may, for example, be selected for the emitter 3.1; the emitter 3.2 would receive 450 Hz, the emitter 3.3 500 Hz, and the emitter 3.4 550 Hz. The remaining emitters accordingly then receive higher modulation frequencies. The respective modulation is clearly allocated to the relevant emitter via the control system 11 and the individually activated power supply units 13.

Although, in the case of the illustration according to FIG. 2, all of the emitters of an emitter group are modulated simultaneously, it may also be provided that emitters are modulated individually only for a short time. A modulation is then, for example, impressed on the emitter 4.1, while it is at the same time checked whether this modulation is detected by the UV sensor. In the Fourier-transformed spectrum, a curve similar to that in FIG. 2 then appears, and the absence of this curve is an indication of a failure of the emitter or an associated component.

It may be seen from the illustration of FIG. 1 that not all of the emitters contribute uniformly to the signal received by the UV sensor 10. The emitter 3.1, for example, is thus cut off, in the direct line of sight, from the UV sensor 10, whereas the emitter 5.2 directly supplies the UV sensor with radiation. It is therefore to be expected that the signal that is received only indirectly from the emitter 3.1 provides a smaller contribution to the total intensity received. In order to compensate this geometrical dependency and to calibrate the monitoring system, the following process may be carried out.

Firstly, after installation, all of the emitters may be switched on without modulating their operating voltage. The modulation to the operating voltage may then be impressed individually for each emitter before it is checked and recorded what intensity the associated curve (f3.1 to f8.4) has. This curve may then be standardized as a 100% signal for the relevant emitter. If, over the course of time, the operating voltage has to be increased, due to ageing of the emitters, in order to ensure a constant UV intensity in the waste water 1 and the modulation is also altered proportionately, the intensity of the respective curve will not change. It may therefore be checked at any time whether an individual emitter is producing the provided intensity and whether the emitters of a group or all of the emitters in total are producing a uniform power, or whether some emitters decrease in power to a greater extent than others. Finally, it is possible individually to adjust the power of the separate emitters in order to achieve a uniform overall distribution of the radiation intensity in the waste water 1.

In the case of larger systems than the disinfection system illustrated in FIG. 1, it may be necessary to use a plurality of sensors. This is particularly necessary if a plurality of channels 2, which are optically separated from one another, is provided in the disinfection device. Nevertheless, the advantage is maintained that there is no need for a separate UV sensor for each emitter and that, owing to the individual modulation frequency, the individual radiation contribution may be determined even during simultaneous operation of other adjacent emitters.

The present embodiment proposed, as the type of modulation, amplitude modulation at a frequency of several hundred to several thousand hertz and a modulation range of +/−10% of the operating voltage. Other types of modulation are also possible. The signal may, for example, be modulated to the operating voltage as a pulse modulation in the form of a pulse-width modulation. Other methods, which are better adapted to the selected type of modulation than the above-described Fourier transformation, may then be required for the purposes of demodulation. Band-pass filters, which purposefully filter out the modulation frequency from the total signal, may, for example, be used.

The specification incorporates by reference the disclosure of German priority document 103 37 378.0 filed Aug. 13, 2003 and PCT/EP2004/009035 filed Aug. 12, 2004.

The present invention is, of course, in no way restricted to the specific disclosure of the specification and drawings, but also encompasses any modifications within the scope of the appended claims.

The invention claimed is:

1. A device for the UV treatment of fluids flowing in a flow channel, comprising;
    a plurality of UV emitters that are disposed in the flow channel;
    at least one UV sensor adapted to monitor an operating state of the UV emitters;
    at least one power supply means for supplying power to said UV emitters, wherein said at least one power supply means is configured to modulate an operating voltage, for individual ones of said emitters or groups of said emitters, that is supplied to said emitters during operation; and
    at least one unit, connected with said at least one UV sensor, for monitoring said UV emitters, wherein said at least one unit is configured to evaluate a modulation contained in UV radiation emitted by said UV emitters.

2. A device according to claim 1, wherein said UV emitters are low-pressure mercury UV emitters.

3. A device according to claim 2, wherein said low-pressure UV emitters are amalgam-type emitters.

4. A device according to claim 1, wherein the operating voltage for each of said UV emitters is adapted to be modulated individually.

5. A device according to claim 1, wherein the modulation is an amplitude modulation.

6. A device according to claim 1, wherein evaluation of the modulation is adapted to be effected by means of a Fourier transformation.

7. A device according to claim 1, wherein said UV emitters are adapted to be switched off individually for purposes of calibration.

8. A method of operating a UV disinfection device provided with at least one UV emitter, including the steps of:
    supplying at least one UV emitter with an operating voltage for a firing and continuous operation thereof;
    modulating said operating voltage, an operating current, or an electrical power of at least one of said UV emitters;
    detecting UV radiation emitted by said at least one UV emitter with a UV sensor that is adapted to temporally resolve the modulation;
    evaluating a signal recorded by said UV sensor; and
    checking whether the modulation in a signal given off by said UV sensor corresponds to a desired value.

9. A method according to claim 8, wherein said modulating step comprises carrying out modulation differently for each UV emitter.

10. A method according to claim 8, wherein during operation said UV emitters are operated in a substantially unmodulated manner, and wherein for checking an individual emitter, only such individual emitter is supplied with modulated operating voltage.

11. A method according to claim 10, wherein said modulating step is carried out successively for all of said UV emitters.

12. A method according to claim 10, wherein said modulating step is repeated cyclically.

13. A method according to claim 8, wherein for low-pressure mercury UV emitters, the operating voltage has a natural frequency in the range of from 20 kHz to 1 MHz, and wherein modulation of the operating voltage is in the form of amplitude modulation at frequencies of from 100 Hz to 100 kHz.

14. A method according to claim 8, wherein adjacent ones of said UV emitters may be combined into groups, wherein emitters of a given group may be jointly modulated at similar frequencies.

15. A method according to claim 14, wherein the emitters of a given group may be jointly modulated at frequencies that are adjacent in a frequency grid.

* * * * *